(12) United States Patent
Tsuda

(10) Patent No.: US 7,239,758 B2
(45) Date of Patent: Jul. 3, 2007

(54) SIGNAL PROCESSING DEVICE FOR REDUCING NOISE OF IMAGE SIGNAL, SIGNAL PROCESSING PROGRAM, AND SIGNAL PROCESSING METHOD

(75) Inventor: Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 685 days.

(21) Appl. No.: 10/357,463

(22) Filed: Feb. 4, 2003

(65) Prior Publication Data
US 2003/0174221 A1    Sep. 18, 2003

(30) Foreign Application Priority Data
Feb. 7, 2002    (JP)    ............................. 2002-030414
Mar. 28, 2002    (JP)    ............................. 2002-092052

(51) Int. Cl.
*G06K 9/40*    (2006.01)

(52) U.S. Cl. ...................... 382/275; 382/274; 382/282; 358/3.26; 358/3.27; 358/520; 348/241

(58) Field of Classification Search ............... 382/260, 382/274, 275, 284, 282; 358/3.26, 3.27, 358/520, 463; 348/241, 247, 251
See application file for complete search history.

(56) References Cited

U.S. PATENT DOCUMENTS

| | | | | |
|---|---|---|---|---|
| 4,775,885 A | * | 10/1988 | Sato et al. | .................. 348/280 |
| 6,229,954 B1 | * | 5/2001 | Yamagami et al. | ......... 386/117 |
| 6,433,898 B1 | * | 8/2002 | Bestmann | ................... 358/518 |
| 6,618,502 B1 | * | 9/2003 | Okada et al. | ............... 382/167 |
| 6,738,510 B2 | * | 5/2004 | Tsuruoka et al. | ........... 382/167 |
| 6,859,565 B2 | * | 2/2005 | Baron | ........................ 382/275 |

* cited by examiner

*Primary Examiner*—Yosef Kassa
(74) *Attorney, Agent, or Firm*—Oliff & Berridge, PLC

(57) ABSTRACT

The present invention provides a signal processing device for removing image noise. The device includes a first storage part for recording first image data captured from a field of view, a second storage part for recording second image data captured under a different light-receiving condition, and a processing part for reading and performing data processing on the first and second image data. Particularly, the processing part determines the noise situation of each pixel in the image sensor, and in accordance with the noise situation, selectively performs, pixel by pixel, the replacement processing for replacing an output value of the first image data with an output value of a proximate pixel of the same hue as the first image data, and subtracting processing for subtracting the output value of the second image data from the output value of the first image data.

12 Claims, 6 Drawing Sheets

*Fig. 2*

|    | 1 | 2 | 3 | 4 | 5 | 6 | 7 | 8 | 9 | 10 |     |
|----|---|---|---|---|---|---|---|---|---|----|-----|
| 1  | R | G | R | G | R | G | R | G | R | G  | ... |
| 2  | G | B | G | B | G | B | G | B | G | B  | ... |
| 3  | R | G | R | G | R | G | R | G | R | G  | ... |
| 4  | G | B | G | B | G | B | G | B | G | B  | ... |
| 5  | R | G | R | G | R | G | R | G | R | G  | ... |
| 6  | G | B | G | B | G | B | G | B | G | B  | ... |
| 7  | R | G | R | G | R | G | R | G | R | G  | ... |
| 8  | G | B | G | B | G | B | G | B | G | B  | ... |
| 9  | R | G | R | G | R | G | R | G | R | G  | ... |
| 10 | G | B | G | B | G | B | G | B | G | B  | ... |

Fig. 4

| S(i-2,j-2) | S(i-2,j-1) | S(i-2,j) | S(i-2,j+1) | S(i-2,j+2) |
|---|---|---|---|---|
| S(i-1,j-2) | S(i-1,j-1) | S(i-1,j) | S(i-1,j+1) | S(i-1,j+2) |
| S(i,j-2) | S(i,j-1) | S(i,j) | S(i,j+1) | S(i,j+2) |
| S(i+1,j-2) | S(i+1,j-1) | S(i+1,j) | S(i+1,j+1) | S(i+1,j+2) |
| S(i+2,j-2) | S(i+2,j-1) | S(i+2,j) | S(i+2,j+1) | S(i+2,j+2) |

Fig. 5

| Nf(i-2,j-2) | Nf(i-2,j-1) | Nf(i-2,j) | Nf(i-2,j+1) | Nf(i-2,j+2) |
|---|---|---|---|---|
| Nf(i-1,j-2) | Nf(i-1,j-1) | Nf(i-1,j) | Nf(i-1,j+1) | Nf(i-1,j+2) |
| Nf(i,j-2) | Nf(i,j-1) | Nf(i,j) | Nf(i,j+1) | Nf(i,j+2) |
| Nf(i+1,j-2) | Nf(i+1,j-1) | Nf(i+1,j) | Nf(i+1,j+1) | Nf(i+1,j+2) |
| Nf(i+2,j-2) | Nf(i+2,j-1) | Nf(i+2,j) | Nf(i+2,j+1) | Nf(i+2,j+2) |

SIGNAL PROCESSING DEVICE FOR REDUCING NOISE OF IMAGE SIGNAL, SIGNAL PROCESSING PROGRAM, AND SIGNAL PROCESSING METHOD

BACKGROUND OF THE INVENTION

1. Field of the Invention

The present invention relates to a signal processing device, signal processing program, and signal processing method for reducing noise in an image signal.

2. Description of the Related Art

Conventionally known are the following two types of methods for removing noise in image data.

A first method employs a median filter to smooth singular points. More specifically, the method provides the median value of densities of local areas as an output density. For example, with 3 by 3 areas, nine values are sorted in ascending order and the fifth smallest value that is the median value is determined. Filtering image data with such a median filter allows noises such as bright or dark spots to be removed from the image data as singular points.

The second method subtracts a fixed pattern noise image from a field image pixel by pixel. The field image is image data obtained by capturing the image of a subject with an image sensor. On the other hand, the fixed pattern noise image is image data which includes only noises output from an image sensor under a light-receiving environment such as in a dark condition. This subtracting processing allows the fixed pattern noise to be removed from the subject image in phase, thereby providing an image data with its fixed pattern noise removed.

Now, the second method is described below using a mathematical expression.

$$S(m)=So(m)+N(m),$$

where $S(m)$ is the signal level of each pixel in a subject image, $So(m)$ is the actual signal level of each pixel, $N(m)$ is the noise level of each pixel, and m is the serial number of pixels.

The detail of the noise level is given by $$N(m)=Nr(m)+Nf(m),$$

where $Nr(m)$ is random noise and $Nf(m)$ is the fixed pattern noise.

In general, the longer the exposure time t of the image sensor, the stronger the fixed pattern noise. For this reason, an elongated exposure results in Nf>>Nr, causing the fixed pattern noise to be dominant. In such a case, subtracting the fixed pattern image from the field image gives $$So(m) \approx S(m)-Nf(m).$$

That is, it is possible to obtain image data close to a true pixel value.

However, the aforementioned first and second methods for removing the fixed pattern noise have the following problems while it can remove fixed pattern noises to some extent.

In the first method, it is necessary to determine respective median values of each of an enormous number of pixels while referring to pixel values in local areas. This results in processing times elongated a great deal or otherwise requires dedicated hardware to be prepared.

Additionally, in the first method, the values of all pixels are to be replaced with their respective median values, thereby easily causing interpolation mistakes to be made and leading to pseudo color or pattern.

On the other hand, the second method allows subtracting processing to be carried out pixel by pixel, thereby making it possible to easily perform data processing without preparing special hardware. However, there is a problem that a fixed pattern noise approximately equal in level to an image signal cannot sufficiently remove the fixed pattern noise.

SUMMARY OF THE INVENTION

The present invention has developed to solve these problems. It is therefore an object of the present invention to provide a noise removal technique by which a fixed pattern noise is properly removed and additional noises are hardly created.

Now, the present invention will be described below.

(1) The present invention provides a signal processing device for removing image noise and includes a first storage part, a second storage part, and a processing part.

The first storage part records first image data obtained by an image sensor receiving light from a field of view. The second storage part records second image data obtained by the image sensor under a light-receiving condition different from the condition for the first image data. The processing part reads the first image data recorded in the first storage part and the second image data recorded in the second storage part and performs data processing.

In particular, the processing part determines the noise situation of each pixel in the image sensor, and selectively performs replacement processing and subtracting processing pixel by pixel in accordance with the noise situation.

In the replacement processing, the output value of the first image data is replaced with the output value of a proximate pixel of the same hue as the first image data.

On the other hand, in the subtracting processing, the output value of the second image data is subtracted from the output value of the first image data.

(2) Preferably, the second image data is noise data produced by photographing black darkness by the image sensor.

(3) Preferably, the processing part determines the noise situation of each pixel in the image sensor in accordance with the output value of the second image data.

(4) Preferably, the processing part selectively performs the replacement processing and the subtracting processing depending on whether the output value of the second image data exceeds the threshold value. That is, in a noise situation where the threshold value is exceeded, it is preferable to selectively perform the replacement processing. On the other hand, in a noise situation where the threshold value is not exceeded, it is preferable to selectively perform the subtracting processing.

(5) Preferably furthermore, the replacement processing is a processing for calculating any one of an average value and a median value for a plurality of proximate pixels of the same hue and for replacing the output value of the first image data with the calculated value.

(6) Preferably, the replacement processing is a processing for replacing, when the proximate pixel of the same hue has already been processed, the output value of the first image data with the processed value.

(7) Preferably furthermore, the processing part determines the noise situation of each pixel in the image sensor in accordance with a difference between the first image data and the second image data.

(8) Preferably, the processing part determines the noise situation by determining whether the difference between the first image data and the second image data is greater than or less than a difference of the proximate pixel of the same hue.
(9) Preferably furthermore, the processing part determines the noise situation by determining whether the difference between the first image data and the second image data is greater than or less than a standard deviation of differences of the proximate pixels of the same hue.
(10) Preferably, when the difference between the first image data and the second image data is greater than a threshold value corresponding to a maximum difference of the proximate pixels of the same hue, the processing part replaces the first image data with the maximum difference.

Preferably furthermore, when the difference is less than a threshold value corresponding to a minimum difference of the proximate pixels of the same hue, the processing part replaces the first image data with the minimum difference.

Preferably still furthermore, the processing part replaces the first image data with the difference when the difference does not fall under either of the above two cases.
(11) Preferably, when the difference is greater than a threshold value corresponding to a "second largest difference" of the proximate pixels of the same hue, the processing part replaces the first image data with the "second largest difference".

Preferably furthermore, when the difference is less than a threshold value corresponding to a "second smallest difference" of the proximate pixels of the same hue, the processing part replaces the first image data with the "second smallest difference".

Preferably still furthermore, the processing part replaces the first image data with the difference when the difference does not fall under either of the above two cases.
(12) Preferably, when the difference is greater than a predetermined threshold value, the processing part replaces the first image data with the difference.

Preferably furthermore, when the difference is less than the predetermined threshold value, the processing part calculates any one of an average value and a median value for differences of the proximate pixels of the same hue, and replaces the first image data with the calculated value.
(13) A signal processing program according to the present invention allows a computer to serve as the first storage part, the second storage part, and the processing part as set forth in (1) described above.
(14) A signal processing method according to the present invention is to remove noise in image data. The method includes the steps of: recoding first image data obtained by an image sensor receiving light from a field of view; recording second image data obtained by the image sensor under a light-receiving condition different from the condition for the first image data; and reading the first image data recorded in the first storage part and the second image data recorded in the second storage part and performing data processing. In particular, the step of performing data processing includes the steps of determining a noise situation of each pixel in the image sensor, and selectively performing replacement processing and subtracting processing pixel by pixel in accordance with the noise situation. That is, in the replacement processing, the output value of the first image data is replaced with the output value of one of proximate pixels of the same hue as the first image data. On the other hand, in the subtracting processing, the output value of the second image data is subtracted from the output value of the first image data.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2 is an explanatory view showing a Bayer pattern used for CCDs;

FIG. 4 is an explanatory view showing a pattern of output values of field image data;

FIG. 5 is an explanatory view showing a pattern of output values of dark image data;

DESCRIPTION OF THE PREFERRED EMBODIMENTS

Now, embodiments of the present invention will be described below in more detail with reference to the accompanying drawings.

[First Embodiment]

Figure 1:
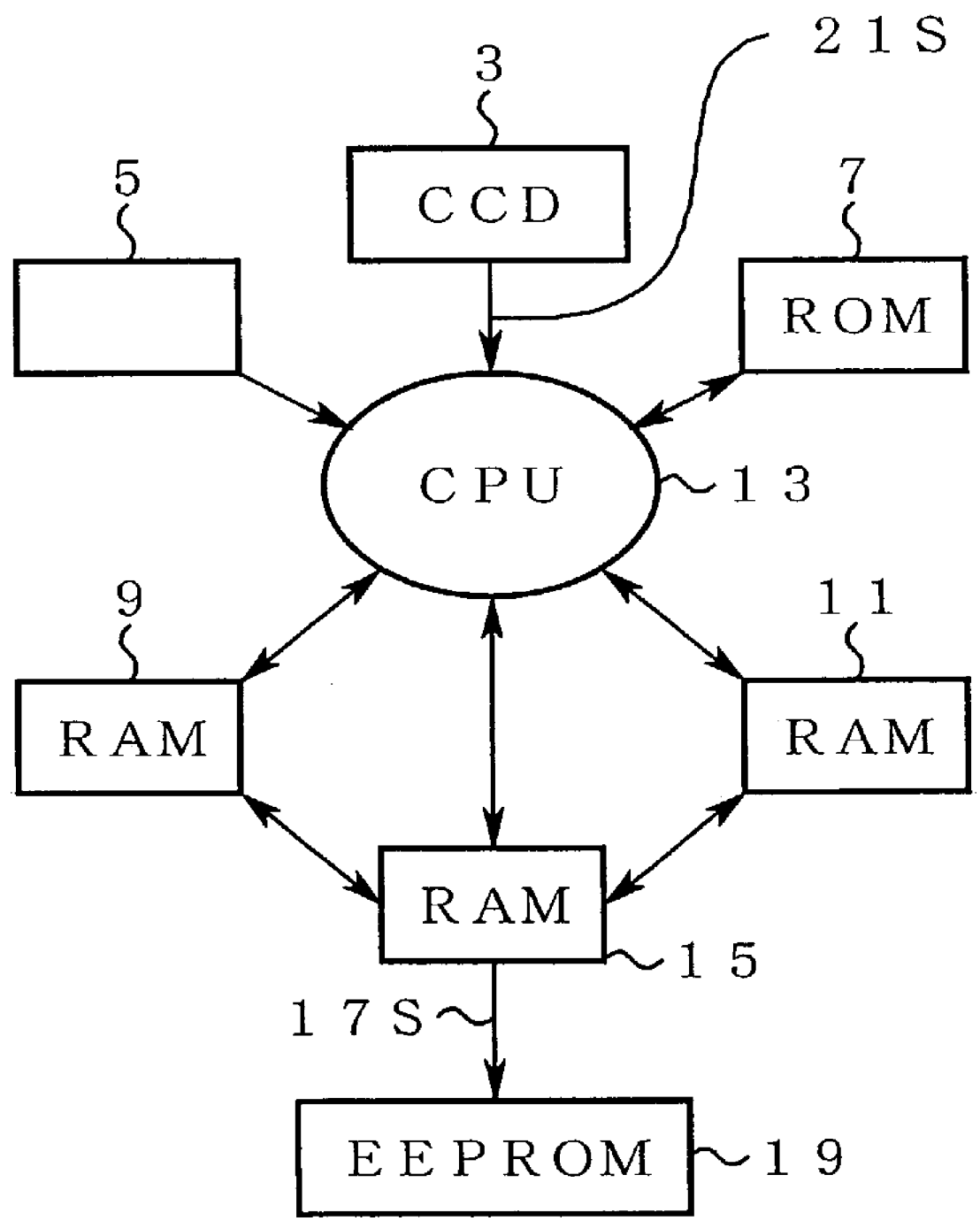
FIG. 1 is a block diagram showing an embodiment of a signal processing device.

FIG. 1 is a block diagram showing a signal processing device 1 incorporated into a digital camera.

The signal processing device 1 includes a CCD 3, which is an image sensor for receiving light from a field of view and then converting it to electrical signals, and a release button 5 for determining the moment of capturing the field image. The signal processing device 1 also includes a ROM 7 having a program stored therein for controlling the signal processing device 1.

Furthermore, the signal processing device 1 includes a RAM 9 as a first storage part for recording therein field image data which is first image data obtained by photographing a field of view, and a RAM 11 as a second storage part for recording therein dark image data which is second image data obtained under a light-receiving condition (e.g., in black darkness with the shutter closed) different from the condition under which the field image data is obtained.

The signal processing device 1 further includes a CPU 13. The CPU 13 is a processing part that reads and performs data processing on the field image data recorded in the RAM 9 and the dark image data recorded in the RAM 11, and controls other parts of the signal processing device 1.

Still furthermore, the signal processing device 1 includes a RAM 15 for storing the results of the data processing by the CPU 13 using the data from the RAM 9 and the RAM 11, and an EEPROM 19 for storing therein an image signal output 17S from the RAM 15.

Now, the data processing performed by the signal processing device 1 is briefly explained below.

The signal processing device 1 is characterized by being capable of effectively removing noise components without subtracting excessively, upon subtracting dark image data from the field image data to remove the fixed pattern noise.

To this end, in accordance with the dark image data, the signal processing device 1 selectively performs on each pixel the replacement processing for replacing the output value of the field image data by the output value of a proximate pixel of the same hue and the subtracting processing for subtracting the output value of the dark image data from the output value of the field image data.

This is discussed more specifically below using mathematical expressions.

The CCD 3 has a Bayer pattern of the primary colors RGB as shown in FIG. 2, with the pixels of the same hue arranged alternately in the vertical, horizontal, and diagonal directions. For this reason, the image data of $m^{th}$ line is arranged as expressed by the following equation.

That is, the field image data S that is the first image data is expressed by $$\ldots, B(n-3, m), G(n-2, m), B(n-1, m), G(n, m), B(n+1, m), G(n+2, m), B(n+3, m), \ldots \quad (1).$$

On the other hand, the dark image data N that is the second image data is expressed by $$\ldots, B'(n-3, m), G'(n-2, m), B'(n-1, m), G'(n, m), B'(n+1, m), G'(n+2, m), B'(n+3, m), \ldots \quad (2).$$

Suppose that G'(n, m) has a value close to the saturation level of the CCD 3 upon subtracting G'(n, m) from G(n, m) to remove the fixed pattern noise Nf. In this case, the actual signal level So has high possibility of being clipped, and if subtracted as it is, often resulting in a reduced difference or dark spot noise.

In this connection, when the output value of the dark image data exceeds a predetermined threshold value P, that is, G'(n, m)>P, the pixel is replaced with the second closest pixel or the previous proximate pixel of the same hue in the same $m^{th}$ line. On the other hand, when the output value of the dark image data is less than or equal to the threshold value P, that is, G'(n, m)≦P, the output value of the dark image data is subtracted from the output value of the field image data.

For example, assuming that B'(n-1, m)>P and G'(n+2, m)>P, subtracting Equation (2) from Equation (1) gives the noise removal data NR as follows;

$$\ldots NR(n-3, m), NR(n-2, m), B(n-3, m), NR(n, m), NR(n+1, m), G(n, m), NR(n+3, m), \ldots \quad (3).$$

Suppose that an electrical signal 21S from the CCD 3 is converted by an A/D converter (not shown) into 12-bit data. In this case, since gray scales are expressed in 4096 levels, it is preferable for the threshold value P to be close to the saturation level of the CCD 3. For example, the threshold value P is close to 3800.

Figure 3:
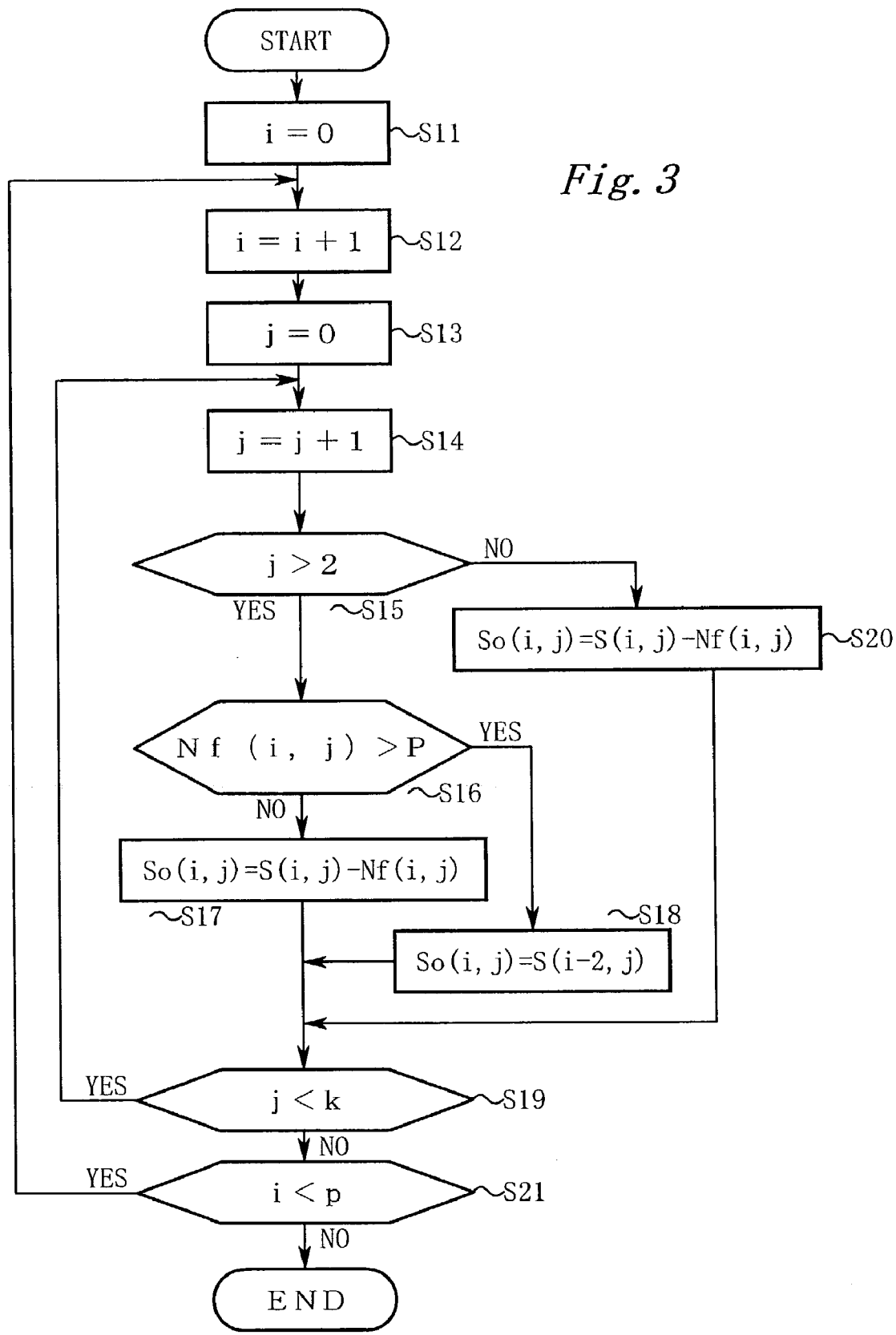
FIG. 3 is an explanatory view showing the flow of a program stored in a ROM.

FIG. 3 is an explanatory view showing the flow of the data processing in the signal processing device 1.

This figure shows the data processing using a CCD 3 with a Bayer pattern of k rows and p columns.

First, the release button 5 is depressed. This allows field image data and dark image data to be captured by the CCD 3, activating a data processing program stored in the ROM 7. The processing routine of the program is organized as follows.

First, in step S11, zero is substituted into symbol i indicative of a given column in the Bayer pattern.

Then, in step S12, one is added to i.

Subsequently, in step S13, zero is substituted into symbol j indicative of a given row in the Bayer pattern.

Then, in step S14, one is added to j.

In step S15, the process determines whether j is greater than 2. If j is greater than 2, the process proceeds to step S16. On the other hand, if j is equal to 1 or 2, the process proceeds to step S20, where Nf(i, j) is subtracted from S(i, j) to find So(i, j). The process then proceeds to step S19.

In step S16, the process determines whether Nf(i, j) is greater than the threshold value P. If Nf(i, j) is not greater than the threshold value P, the process proceeds to step S17. On the other hand, if Nf(i, j) is greater than the threshold value P, the process proceeds to step S18.

In step S17, Nf(i, j) is subtracted from S(i, j) to find So(i, j). In other words, the output value of the dark image data is subtracted from the output value of the field image data.

In step S18, S(i-2, j) is substituted into So(i, j). That is, as the output value of the pixel being currently processed, the output value of the second closest previous pixel in the same row is taken.

In step S19, the process determines whether j is less than k. If j is less than k, the process returns to step S14, where one is added to j, whereas if j is not less than k, the process proceeds to step S21, In step S21, the process determines whether i is less than p. If i is less than p, the process returns to step S12, where one is added to i, whereas if i is not less than p, the process recognizes that the processing has been completed on all the pixels and ends the data processing.

In the aforementioned embodiment, the process selectively performs the replacement processing for replacing the output value of the field image data with the output value of the field image data of the second proximate previous pixel of the same hue and the subtracting processing for subtracting the output value of the dark image data from the output value of the field image data. This selective operation allows the replacement processing to be performed on a pixel which presumably has a fixed pattern noise almost as high as the saturation level and cannot have the actual signal level restored. Consequently, this makes it possible to properly remove the fixed pattern noise without causing any detrimental effects due to the subtracting processing. This leads to a positive reduction of noise noticeable in an image appearing in a picture or on a monitor.

Furthermore, the signal processing device and method of the digital camera according to the aforementioned embodiment perform selective processing depending on whether the output value of the dark image data exceeds the threshold value P, i.e., whether the fixed pattern noise is presumably so great as not to be able to restore the actual signal level. This makes it possible to remove the fixed pattern noise properly with ease by setting an appropriate threshold value P.

In the aforementioned embodiment, such an example has been explained in which the output value of a pixel is replaced with the output value of the second closest previous pixel in the same row when the threshold value P is exceeded. However, the output value of a pixel may also be replaced with an average value of two to four pixels out of the four proximate pixels that are adjacent thereto diagonally at its corners. In addition, the output value of a pixel may also be replaced with the output value of any one of the proximate pixels. Such replacements make it possible to suppress noises in an image more strongly. Furthermore, a replacement with an average value of a plurality of proximate pixels allows change in colors to be smoother, thereby making it possible to suppress color noises more strongly.

Furthermore, in the aforementioned embodiment, such an example has been explained in which the output value of a pixel is replaced with the output value of the proximate pixel when the threshold value P is exceeded. However, for the proximate pixel that has already been subjected to the data processing, the output value of the pixel may be replaced with the processed output value of the proximate pixel. In this case, since the replacement of the pixel is made by the proximate pixel having its noise removed, it is possible to suppress noises in the image more strongly.

In the aforementioned embodiment, such an example has been explained in which the threshold value P is set to a value close to the saturation level when the dark image data is subtracted from the field image data. However, the value can be any value so long as it serves to remove the fixed pattern noise. For example, it may be set to a value close to the saturation level for the output of the gamma processing.

Now, a second embodiment will be described below.

[Second Embodiment]

A signal processing device according to the second embodiment is the same as that of the first embodiment (FIG. 1) and will not be repeatedly described here.

In the second embodiment, the CPU 13 calculates the difference between the output value of the field image data and the output value of the dark image data. Then, the maximum and minimum values of the differences in proximate pixels of the same hue to each pixel are calculated. The data processing is then selectively performed in accordance with the maximum and minimum values employed as threshold values.

This is described below using mathematical expressions.

Assume that the output value of the field image data from a given pixel is $S(i, j)$. Then, the pattern of the output values from 5 by 5 pixels with $S(i, j)$ at its center is shown as in FIG. 4.

Likewise, assume that the output value of the dark image data from a given pixel is the output value $Nf(i, j)$ of the fixed pattern noise, the pattern of the output values from the 5 by 5 pixels with $Nf(i, j)$ at its center is shown as in FIG. 5.

Subtracting the dark image data from the field image data gives $$So(i, j)=S(i, j)-Nf(i, j),$$

where $So(i, j)$ is the actual signal level of each pixel.

Since the CCD 3 has the Bayer pattern of the primary colors RGB as shown in FIG. 2, the pixels of the same hue are arranged alternately in both directions of row and column.

For this reason, if $S(i, j)$ is an R or B pixel, there exist eight pixels of the same hue in the surrounding 5 by 5 pixels. The eight pixels corresponding to $S(i-2, j-2)$, $S(i, j-2)$, $S(i+2, j-2)$, $S(i-2, j)$, $S(i+2, j)$, $S(i-2, j+2)$, $S(i, j+2)$, and $S(i+2, j+2)$.

On the other hand, if $S(i, j)$ is a G pixel, there exist twelve pixels of the same hue in the surrounding 5 by 5 pixels. The twelve pixels corresponding to $S(i-2, j-2)$, $S(i, j-2)$, $S(i+2, j-2)$, $S(i-2, j)$, $S(i+2, j)$, $S(i-2, j+2)$, $S(i, j+2)$, $S(i+2, j+2)$, $S(i-1, j-1)$, $S(i-1, j+1)$, $S(i+1, j-1)$, and $S(i+1, j+1)$.

In the second embodiment, the maximum value $Somax(i, j)$ and the minimum value $Somin(i, j)$ of the output values (differences) of actual signal levels from the proximate pixels of the same hue are determined in order to prevent over-subtraction and under-subtraction of the dark image data from the field image data.

Suppose that $So(i, j)>(Somax(i, j)+K)$, where K is a given constant. In this case, $So(i, j)$, having a high possibility of being a singular point (bright spot noise) with respect to other pixels, is replaced with the maximum value $Somax(i, j)$ of the proximate pixels of the same hue.

On the other hand, suppose that $So(i, j)<(Somin(i, j)+K)$, where K is a given constant. In this case, $So(i, j)$, having a high possibility of being a singular point (dark spot noise) with respect to other pixels, is replaced with the minimum value $Somin(i, j)$ of the proximate pixels of the same hue.

Furthermore, suppose that $(Somin(i, j)+K) \leq So(i, j) \leq (Somax(i, j)+K)$, where K is a given constant. In this case, the pixel is determined to be normal, thereby making $So(i, j)=So(i, j)$, and the same output value is employed.

Figure 6:
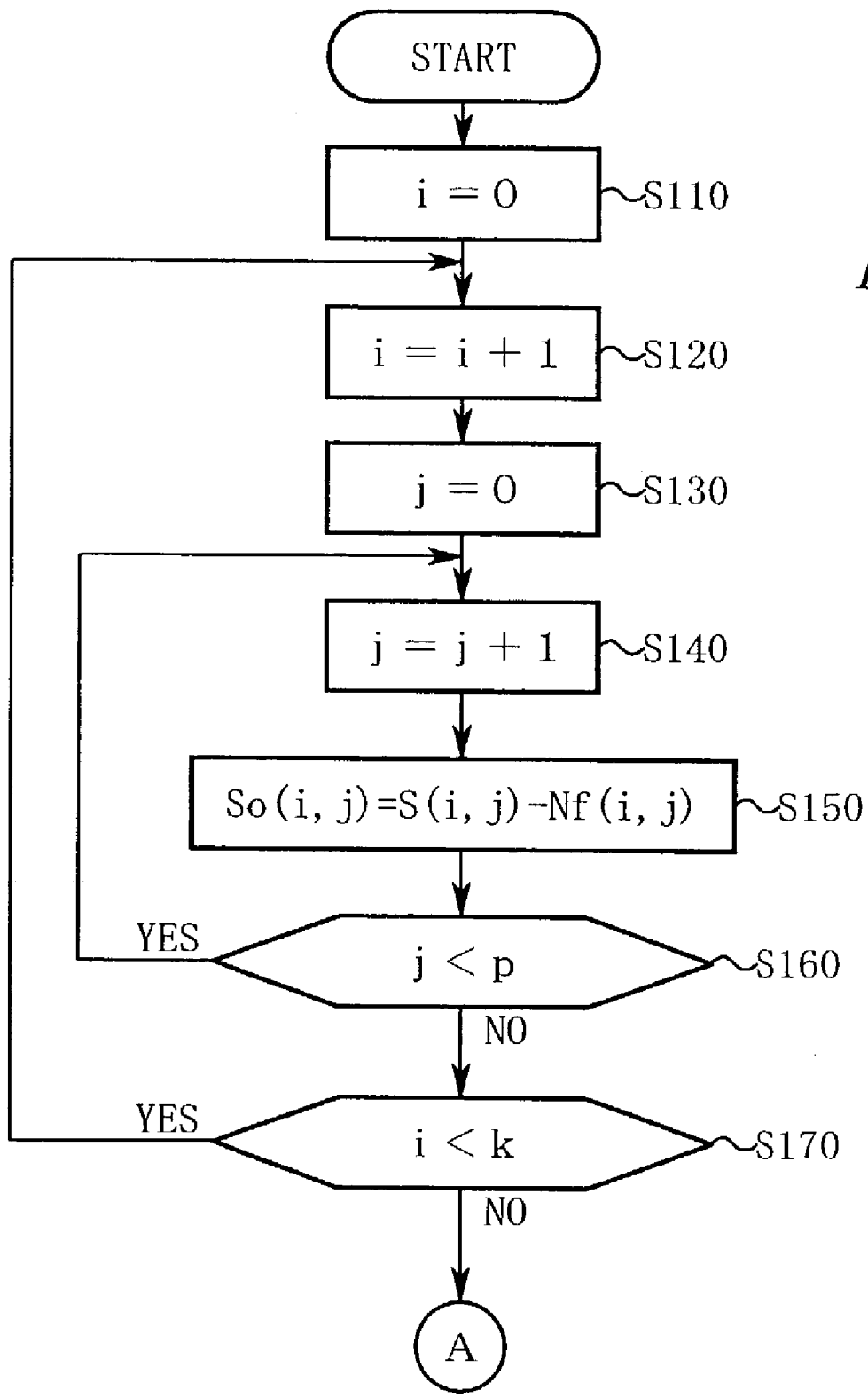
FIG. 6 is an explanatory view showing the flow of a program stored in a ROM.
Figure 7:
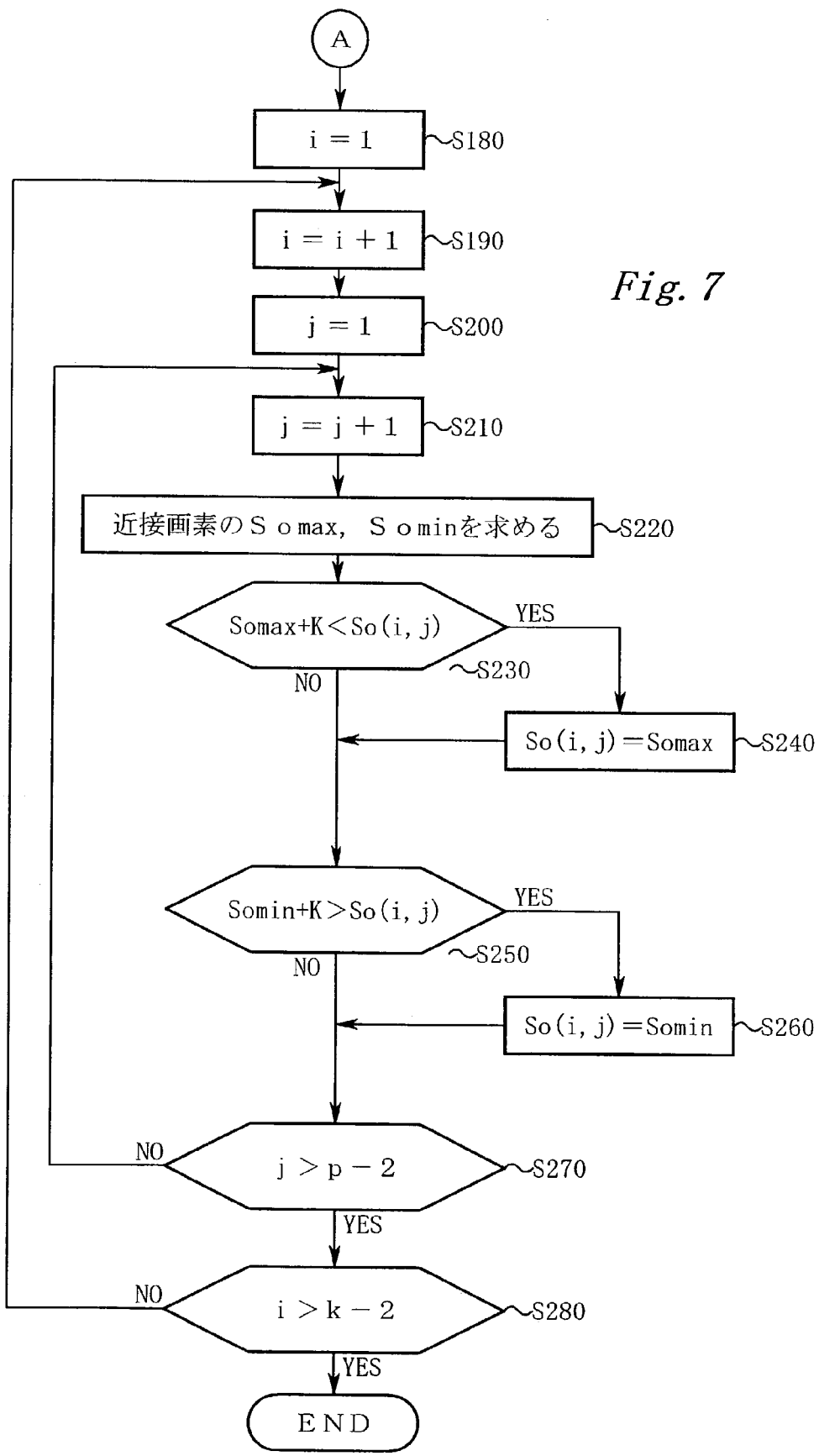
FIG. 7 is a view showing a flow following that of the program shown in FIG. 6.

FIGS. 6 and 7 are explanatory views showing the flow of the data processing performed in the signal processing device.

These figures show the data processing using a CCD 3 with a Bayer pattern of k rows and p columns.

First, the release button 5 is depressed. This allows field image data and dark image data to be captured by the CCD 3, activating a data processing program stored in the ROM 7. The program is organized as follows.

First, in step S110, zero is substituted into symbol i indicative of a given row in the Bayer pattern.

Then, in step S120, one is added to i.

Subsequently, in step S130, zero is substituted into symbol j indicative of a given column of the Bayer pattern.

Then, in step S140, one is added to j.

In step S150, the output value $Nf(i, j)$ of the dark image data is subtracted from the output value $S(i, j)$ of the field image data and the obtained value is substituted into the actual signal level $So(i, j)$ of each pixel.

Then, in step S160, the process determines whether j is less than p. If j is less than p, the process returns to step S140. On the other hand, if j is not less than p, the process proceeds to step S170.

In step S170, the process determines whether i is less than k. If i is less than k, the process returns to step S120. On the other hand, if i is not less than k, the process proceeds to step S180.

In step S 180, one is substituted into i.

Then, in step S190, one is added to i.

Then, in step S200, one is substituted into j.

Then, in step S210, one is added to j.

Subsequently, in step S220, the maximum value of the differences So, in a plurality of proximate pixels to a pixel located at position $(i, j)$, is determined and referred to as $Somax(i, j)$. Likewise, the minimum value of the differences So, in a plurality of proximate pixels to a pixel located at position $(i, j)$, is determined and referred to as $Somin(i, j)$.

Then, in step S230, the process determines whether $So(i, j)$ is greater than $(Somax(i, j)+K)$. If $So(i, j)$ is greater than $(Somax(i, j)+K)$, the process proceeds to step S240. On the other hand, if $So(i, j)$ is not greater than $(Somax(i, j)+K)$, the process proceeds to step S250.

In step S240, $Somax(i, j)$ is substituted into $So(i, j)$, and then the process proceeds to step S250.

In step S250, the process determines whether $So(i, j)$ is less than $(Somin(i, j)+K)$. If $So(i, j)$ is less than $(Somin(i, j)+K)$, the process proceeds to step S260. On the other hand, if $So(i, j)$ is not less than $(Somin(i, j)+K)$, the process proceeds to step S270.

In step S260, $Somin(i, j)$ is substituted into $So(i, j)$, and then the process proceeds to step S270.

In step S270, the process determines whether j is greater than (p−2). If j is not greater than (p−2), the process then returns to step S210. On the other hand, if i is greater than (p−2), the process then proceeds to step S280.

In step S280, the process determines whether j is greater than (k−2). If i is not greater than (k−2), the process then returns to step S19. On the other hand, if i is greater than (k−2), the process recognizes that the processing has been completed on all the pixels and ends the data processing.

In the second embodiment, the field image data recorded in the RAM 9 and the dark image data recorded in the RAM 11 are read and the difference therebetween is calculated to determine a threshold value pixel-by-pixel, thereby performing signal processing selectively. This makes it possible to perform interpolation processing with high accuracy when compared with the method by which processing is selectively performed on all pixels based on one threshold value. Additionally, even when the fixed pattern noise level is significantly high, it is possible to properly remove the fixed pattern noise.

Furthermore, in the aforementioned second embodiment, since the threshold value is determined in accordance with the maximum and minimum values of the differences in proximate pixels of the same hue, it is possible to properly eliminate the output values that lie outside a predetermined range.

Furthermore, in the aforementioned second embodiment, the output value of a pixel (bright spot noise) whose fixed pattern noise is presumed to be excessively high is replaced with the maximum value of the differences in the proximate pixels, whereas the output value of a pixel (dark spot noise) whose fixed pattern noise is presumed to be excessively low is replaced with the minimum value of the differences in the proximate pixels. This allows the output value of the pixel to be replaced with a value within the range of the outputs of the proximate pixels, thereby enabling the color of the pixel to be blended into those of the proximate pixels.

[Third Embodiment]

The third embodiment is different from the second embodiment only in that the "second largest difference Somax2" and the "second smallest difference Somin2" are employed in place of the maximum difference Somax and the minimum difference Somin.

That is, in step S230, the process determines whether So(i, j) is greater or less than the "second largest difference Somax2". In this case, if So(i, j) is determined excessively greater than the proximate pixels, So(i, j) is replaced with Somax2.

On the other hand, in step S250, the process determines whether So(i, j) is greater or less than the "second smallest difference Somin2". In this case, if So(i, j) is determined excessively less than the proximate pixels, So(i, j) is replaced with Somin2.

Accordingly, when compared with the second embodiment where So(i, j) is replaced with the maximum and minimum values of outputs of the proximate pixels, this embodiment has an advantage that So(i, j) is less subject to the fixed pattern noise of the proximate pixels. Consequently, it is possible to prevent under-subtraction and over-subtraction of the fixed pattern noise Nf(i, j).

In the aforementioned second and third embodiments, such an example has been described in which the threshold value is determined in accordance with the maximum and minimum values of differences of the proximate pixels of the same hue. However, the values such as K can be determined in accordance with the standard deviation of differences of the proximate pixels of the same hue.

Furthermore, in the aforementioned second and third embodiments, such an example has been described in which the output values of twelve proximate pixels are employed to determine the maximum and minimum output values of the pixels proximate to a G pixel. However, as R and B pixels, the output values of eight proximate pixels may be employed.

Furthermore, in the aforementioned second and third embodiments, such examples have been described in which a replacement is performed with the maximum and minimum values of differences of the proximate pixels of the same hue and in which a replacement is performed with the second largest value and the second smallest value. However, the replacement may also be performed with an average or median value of the differences of a plurality of proximate pixels. Now, preferable examples of conditions for selecting a plurality of proximate pixels are mentioned below.

(1) The average value of the largest to the third largest output values of proximate pixels of the same hue and the average value of the smallest to the third smallest output values of the proximate pixels of the same hue are employed.

(2) Average values are determined for each of a certain number of blocks of proximate pixels of the same hue, and the output value of any one of the blocks is used in consideration of the tendency of change in output values.

(3) The manner of making the blocks is changed little by little in section (2) and the average value of each block is determined each time the change is made. Then, the output value of any one of the certain number of blocks is used in sufficient consideration of the tendency of change in output values.

As described above, in the second and third embodiments, the field image data (the first image data) and the dark image data (the second image data) are read to calculate differences therebetween, and signal processing is selectively performed based on the threshold value determined for each pixel. Accordingly, when compared with the method by which all pixels are determined in accordance with one threshold value, it is possible to perform interpolation processing and noise removal processing with higher accuracy. Additionally, even when the fixed pattern noise level is significantly high, it is possible to properly remove the fixed pattern noise.

The invention is not limited to the above embodiments and various modifications may be made without departing from the spirit and scope of the invention. Any improvement may be made in part or all of the components.

What is claimed is:

1. A signal processing device for removing image noise comprising:

a first storage part for recording first image data obtained by an image sensor receiving light from a field of view;

a second storage part for recording second image data obtained by said image sensor with a shutter closed; and a processing part for reading said first image data recorded in said first storage part and said second image data recorded in said second storage part, and for performing data processing on the first and second image data, wherein said processing part determines, pixel by pixel, a situation of a noise output from the image sensor and in accordance with said noise situation, selectively performs, pixel by pixel, a replacement processing for replacing an output value of said first image data with an output value of one of proximate pixels of the same hue as said first image data, and a subtracting processing for subtracting an output value of said second image data from the output value of said first image data.

2. The signal processing device according to claim 1, wherein
said processing part determines the noise situation of each pixel in said image sensor in accordance with the output value of said second image data.

3. The signal processing device according to claim 2, wherein
said processing part selectively performs said replacement processing in a noise situation where the output value of said second image data exceeds a threshold value, and selectively performs said subtracting processing in a noise situation where the output value of said second image data is less than or equal to said threshold value.

4. The signal processing device according to claim 1, wherein
said replacement processing is a processing for calculating any one of an average value and a median value for a plurality of said proximate pixels of the same hue and replacing said first image data with the calculated value.

5. The signal processing device according to claim 1, wherein
said replacement processing is a processing for replacing, when said proximate pixel of the same hue has already been processed, said first image data with the processed value.

6. The signal processing device according to claim 1, wherein
said processing part determines the noise situation of each pixel in said image sensor in accordance with a difference between said first image data and said second image data.

7. The signal processing device according to claim 6, wherein
said processing part determines said noise situation by determining whether said difference is greater than or less than a difference of said proximate pixel of the same hue.

8. The signal processing device according to claim 6, wherein
said processing part determines said noise situation by determining whether said difference is greater than or less than a standard deviation of differences of said proximate pixels of the same hue.

9. The signal processing device according to claim 6, wherein
said processing part replaces, when said difference is greater than a threshold value corresponding to a maximum difference of said proximate pixels of the same hue, said first image data with said maximum difference,
said processing part replaces, when said difference is less than a threshold value corresponding to a minimum difference of said proximate pixels of the same hue, said first image data with said minimum difference, and
said processing part replaces, when said difference does not fall under either of the case, said first image data with said difference.

10. The signal processing device according to claim 6, wherein
said processing part replaces, when said difference is greater than a threshold value corresponding to a "second largest difference" of said proximate pixels of the same hue, said first image data with said "second largest difference",
said processing part replaces, when said difference is less than a threshold value corresponding to a "second smallest difference" of said proximate pixels of the same hue, said first image data with said "second smallest difference", and
said processing part replaces, when said difference does not fall under either of the case, said first image data with said difference.

11. The signal processing device according to claim 6, wherein
said processing part replaces, when said difference is greater than a predetermined threshold value, said first image data with said difference, and
said processing part calculates, when said difference is less than the predetermined threshold value, any one of an average value and a median value for differences of said proximate pixels of the same hue, and replaces said first image data with the calculated value.

12. A signal processing method for removing noise in image data, said method comprising the steps of:
recording first image data obtained by an image sensor receiving light from a field of view;
recording second image data obtained by said image sensor with a shutter closed; and
reading said first image data recorded in a first storage part and said second image data recorded in a second storage part, and performing data processing on the first and second image data, wherein
said step of performing data processing includes the steps of determining, pixel by pixel, a situation of a noise output from the image sensor and in accordance with said noise situation, selectively performing, pixel by pixel, a replacement processing for replacing an output value of said first image data with an output value of one of proximate pixels of the same hue as said first image data, and a subtracting processing for subtracting an output value of said second image data from the output value of said first image data.

* * * * *